UNITED STATES PATENT OFFICE.

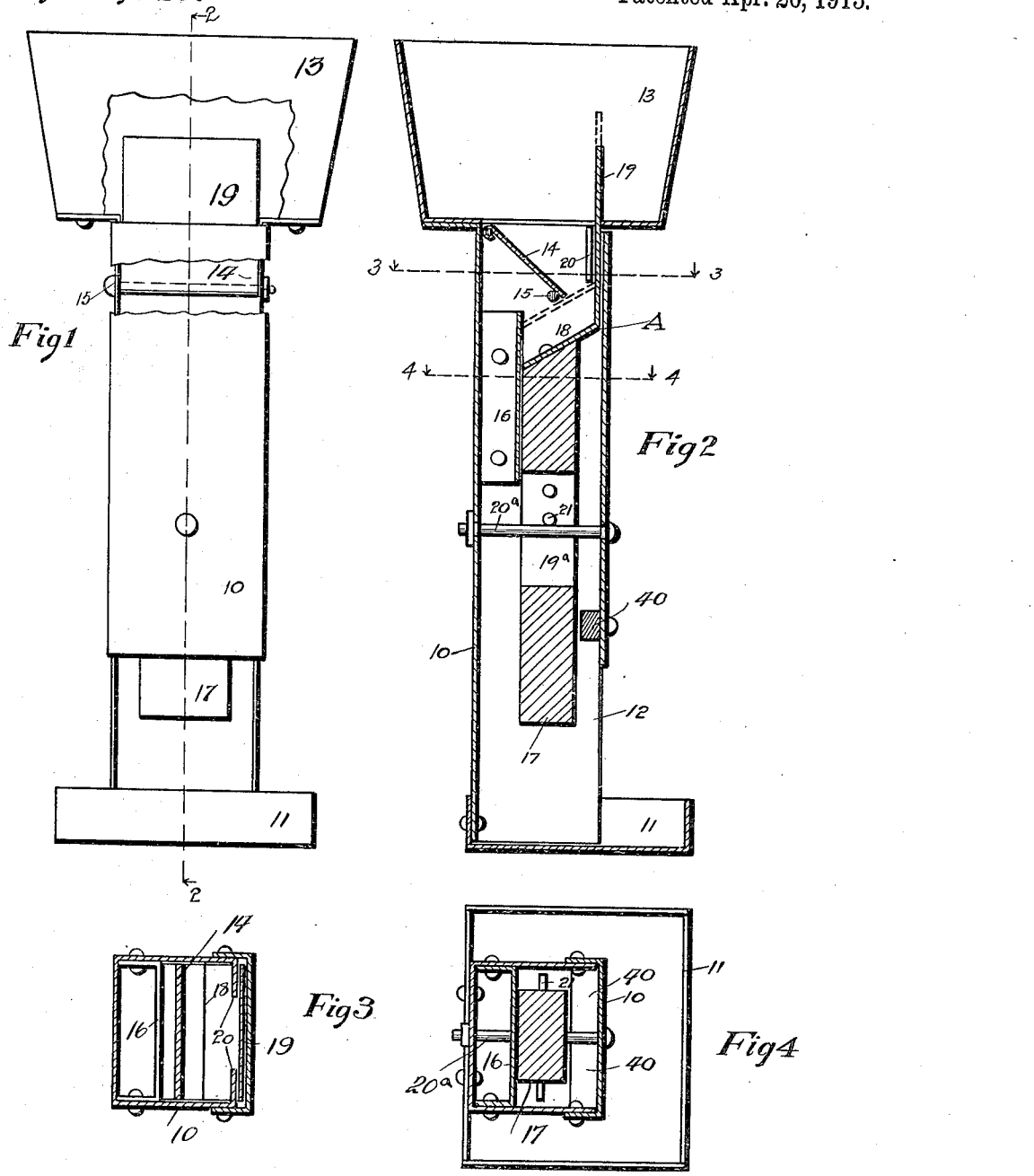

ELSWORTH J. SMITH, OF HASTINGS, IOWA.

AUTOMATIC STOCK-FEEDER.

1,136,843.  Specification of Letters Patent.  Patented Apr. 20, 1915.

Application filed April 27, 1914. Serial No. 834,822.

*To all whom it may concern:*

Be it known that I, ELSWORTH J. SMITH, a citizen of the United States, and resident of Hastings, in the county of Mills and State of Iowa, have invented a certain new and useful Automatic Stock-Feeder, of which the following is a specification.

The object of my invention is to provide an automatic stock feeder of simple, durable and inexpensive construction.

It is my further and more particular object to provide a stock feeder adapted to be placed in communication with a hopper or granary, with its lower end in a suitable trough or the like, which stock feeder includes a movable receiving cup adapted in one position of its movement to discharge to the lower end of the feeder, and operatively connected with a plunger or the like, designed to be operated by the feeding animal for moving the cup to its discharge position.

Still a further object is to provide such an automatic stock feeder, capable of being adjusted for varying the amount discharged with each movement of the receiving cup.

My invention consists in certain details, in the construction, combination and arrangement of the various parts of the device, whereby the objects contemplated are attained, as hereinafter more fully set forth, pointed out in my claims and illustrated in the accompanying drawings, in which:

Figure 1 shows a front elevation of an automatic stock feeder, embodying my invention. Fig. 2 shows a transverse, vertical, sectional view of the same, taken on the line 2—2 of Fig. 1. Fig. 3 shows a horizontal, sectional view, taken on the line 3—3 of Fig. 2, and Fig. 4 shows a horizontal, sectional view, taken on the line 4—4 of Fig. 2.

In the accompanying drawing I have used the reference numeral 10 to indicate generally an upright hollow chute which may be rectangular in cross section, as shown, and may be made of any suitable material. The lower end of the shaft is received in a suitable trough or the like 11 and the front wall of the shaft 10 is cut away at its lower end at 12 to permit access to the interior thereof. The upper end of the shaft 10 is in communication with the hopper 13 which may be any suitable receptacle for grain such as a chute, granary or the like. Hinged to the rear wall of the chute or shaft 10, near its upper edge, is a downwardly and forwardly extending leaf or plate 14, the forward edge of which is slightly spaced apart from the front wall of said shaft or chute. The downward movement of the leaf or plate 14 is limited by means of the transverse rod or wire 15, extended through the side walls of the chute 10. Secured to the rear wall of the chute 10, near the upper end thereof, is a second smaller chute 16. The upper end of the chute 16 is approximately at or slightly below the level of the lower end of the plate or leaf 14, which plate or leaf is extended beyond the chute 16 so that no grain, feed or the like could pass over the hopper 13 directly into the chute 16. The chute 16 extends from side to side in the chute 10. Within the chute 10 is a vertically arranged bar or plunger 17, the lower end of which extends normally below the upper portion of the opening 12, as shown in Fig. 2, and the upper end of which extends normally to a point below the level of the upper edge of the chute 16. The upper end of the plunger 17 is preferably slightly beveled from the chute 16 upwardly and toward the front wall of the chute 10. Resting upon said beveled upper end and extending to the front wall of the chute 12 is a plate 18 which extends from side to side in the chute 10. Formed on the upper edge of the plate 18 is an upward extension 19, extending upwardly adjacent to the front wall of the chute 16, the side walls above the upper end thereof within the hopper 13.

Formed on the side walls of the chute 10 are inwardly extending guide devices 20. The extension 19 slides between the guide devices 20 and the front wall and side walls of the chute 10.

It will be seen that a pocket is formed above the plate 18 which has for its walls the front wall of the chute 16, the side walls of the chute 10 and the extension 19. It will be seen also that any grain passing through the bottom of the hopper 13 will slide down over the leaf 14 into the pocket which I have indicated generally in Fig. 2 by the reference character A. On the inner lower surface of the front wall of the chute 10, just above the opening 12, is a transverse reinforcing member 40.

In the practical operation of my improved automatic stock feeder, corn, stock food or the like, will pass from the hopper 13 over the leaf 14 into the pocket A. On account of the fact that the upper end of the chute 16 is practically on a level with the lower end of the leaf 14 the grain in the pocket will form an automatic seal and will not overflow into the chute 16. When a hog, for instance, pushes the plunger 17 upwardly, the grain in the pocket A will overflow the upper end of the chute 10 and drop down through the chute 16 and the chute 10 to the trough 11 and when the supply in the trough is exhausted the animal quickly learns to push the plunger 17 upwardly to get a fresh supply. The plunger 17 is held in position by the following means: Formed in the plunger 17 is an elongated slot 19$^a$, extending through it from front to rear and of considerable depth from top to bottom, as shown in Fig. 2. Extended through the front and rear walls of the chute 10 and through the slot 19$^a$ is a bolt 20$^a$. The slot 19$^a$ limits the upward and downward movement of the plunger 17. If it is desired to vary the distance of said movement and thereby vary the amount of grain delivered to the chute 16 at each upward movement of the plunger 17, a rod 21 may be extended through the side walls of the chute 10 and through the holes in the sides of the plunger 17. The holes in the sides of the plunger 17 are arranged in pairs in alinement with each other. It will readily be seen that if the rod 21 is placed in the upper pair of holes the pocket A will be deeper than would be the case if the rod 21 were arranged in the lower pair of holes.

As many of my improved stock feeding devices may be used as is desired and they may be made of wood, metal or any suitable material and of any desired size.

When the animal is satisfied, it will cease operating the feeder and there will be practically no food wasted.

My improved stock feeder may be used for feeding corn or other grain, especially prepared stock foods, medicinal powders and the like.

It will be understood that some changes may be made in the details of the construction of my feeder, without departing from its essential features, and it is my intent to cover by this application any such changes which may be included within the scope of the following claims.

I claim as my invention:

1. A chute adapted to have its upper end in communication with a suitable source of supply and having a part of its lower wall cut away, a second chute within the first chute, adjacent to one wall thereof near its upper end, an inclined leaf hinged to the last mentioned wall and extending over said second chute, a plunger mounted for vertical reciprocation within the first chute, means for limiting the vertical movement of said plunger, a plate mounted on the upper end of said plunger arranged in connection with the walls of said chutes to form a pocket.

2. In a device of the class described, a chute having part of its lower wall removed, a plunger mounted for vertical reciprocation therein, a second chute mounted within said first chute, a plate on the upper end of said plunger, which in connection with the walls of said chutes forms a pocket, an inclined leaf, extending over said second chute and having its discharge end above said pocket.

3. In a device of the class described, a chute having part of its lower wall removed, a plunger mounted for vertical reciprocation therein, a second chute mounted within said first chute, a plate on the upper end of said plunger, which in connection with the walls of said chutes forms a pocket, an inclined leaf, extending over said second chute and having its discharge end above said pocket, and means for limiting the vertical movement of said plunger, and guide devices for said pocket.

4. In a device of the class described, a chute having part of its lower wall removed, a plunger mounted for vertical reciprocation therein, a second chute mounted within said first chute, a plate on the upper end of said plunger, which in connection with the walls of said chutes forms a pocket, an inclined leaf, extending over said second chute and having its discharge end above said pocket, means for limiting the vertical movement of said plunger, guide devices for said pocket, a feeding receptacle at the lower end of said chute and a suitable source of supply in communication with the upper end of said chute.

5. In a device of the class described, a chute having part of its lower wall removed, a plunger mounted for vertical reciprocation therein, a second chute mounted within said first chute, a plate on the upper end of said plunger, which in connection with the walls of said chutes forms a pocket, an inclined leaf, extending over said second chute and having its discharge end above said pocket, and means for limiting the vertical movement of said plunger, said limiting means being mounted in the walls of said chute and being adjustable with relation to said plunger, and guide devices for said pocket.

Des Moines, Iowa, April 11, 1914.

ELSWORTH J. SMITH.

Witnesses:
L. E. ALLENSWORTH,
H. W. LUTHER.

Copies of this patent may be obtained for five cents each, by addressing the "Commissioner of Patents, Washington, D. C."